United States Patent [19]

Howlett

[11] Patent Number: 4,689,532
[45] Date of Patent: Aug. 25, 1987

[54] FERRITIC SENSOR, SELF-CONTROLLED SYNCHRONOUS MOTOR

[76] Inventor: James F. Howlett, 3794 Kenwick Trail, Roanoke, Va. 24018

[21] Appl. No.: 731,387

[22] Filed: May 7, 1985

[51] Int. Cl.⁴ .......................................... H02K 29/08
[52] U.S. Cl. .................................. 318/254; 318/138; 324/160; 324/174; 324/179
[58] Field of Search .................... 318/138, 254 A, 254, 318/439, 312, 315, 316, 319, 320; 310/68 R; 324/160, 167, 173, 174, 179

[56] References Cited

U.S. PATENT DOCUMENTS

| | | | |
|---|---|---|---|
| 3,693,417 | 9/1972 | Fritz et al. | 318/653 X |
| 3,820,090 | 6/1974 | Wiegand | 365/62 X |
| 3,831,071 | 8/1974 | Mitsui | 318/254 A |
| 4,130,769 | 12/1978 | Karube | 310/46 |
| 4,329,636 | 5/1982 | Uchida et al. | 318/254 |
| 4,378,258 | 3/1983 | Clark et al. | 148/31.57 X |
| 4,507,590 | 3/1985 | Miyazaki | 318/313 X |

FOREIGN PATENT DOCUMENTS

| | | | |
|---|---|---|---|
| 55-109167 | 8/1980 | Japan | 318/254 |
| 57-9286 | 1/1982 | Japan | 318/254 |
| 0807457 | 2/1981 | U.S.S.R. | 318/254 |

OTHER PUBLICATIONS

"Ferritic Fe-Ni Magnetic Sensor Wires with End-to-End Voltage-Generating Characteristics", by S. Jin, R. B. van Dover, R. C. Sherwood, and T. H. Tiefel of AT&T Bell Laboratories, Murray Hill, New Jersey 07974.

"Components", Electronic Industry, May 1979, pp. 23-27.

"Transistor Motor, a Brushless D-C Motor", Toshiba Review No. 46, pp. 50-54, Jan.-Feb. 1970.

Primary Examiner—William M. Shoop, Jr.
Assistant Examiner—Bentsu Ro
Attorney, Agent, or Firm—Stevens, Davis, Miller & Mosher

[57] ABSTRACT

A self-controlled synchronous motor is provided with at least one armature winding, a rotor rotatably mounted for rotation in proximity to the winding, and a magnet located on the rotor for providing a magnetic flux. At least one Fe-Ni sensor wire is located within the vicinity of variations in magnetic field intensity produced by rotor rotation and provides an output electrical signal indicative of the position of the rotor. The sensor wire in a preferred embodiment is comprised of a plastically twisted ferritic Fe Ni alloy which provides a substantial voltage output when placed within a magnetic field of varying intensity. In addition to the self-controlled synchronous motor there is further disclosed a method for operating such synchronous motors through the step of sensing changes in the magnetic field intensity during rotation of the rotor and in response to the sensed changes in magnetic field intensity applying current to one or more of the armature-windings in the motor. In a further embodiment, the counting of voltage pulses can with the same type of sensors, provide a rotational velocity output. This operates either in conjunction with rotor position sensing in a motor, or as a separate stand-alone unit, i.e. a tachometer/speedometer.

17 Claims, 6 Drawing Figures

FERRITIC SENSOR, SELF-CONTROLLED SYNCHRONOUS MOTOR

BACKGROUND OF THE INVENTION

1. Field of the Invention

The present invention relates generally to rotation sensor devices for sensing the rotation of an electric motor, and more specifically to an improved magnetic rotation sensor device responsive to changes in magnetic field intensity.

2. Discussion of the Prior Art

Self-controlled synchronous motors is the name generally applied to thyristor motors and transistor motors well-known in the art. These brushless DC motors require a rotation sensor device in order to sense the angular position of the motor shaft and subsequently control the conduction of thyristors and transistors involved to ensure the proper sequential energization and de-energization of the armature windings in the motor.

In conventional self-controlled synchronous motors a position sensor senses the actual position of the rotor of the motor and provides a position signal to a phase control circuit. The phase control circuit responds to the actual position signal and controls the conduction of transistors or thyristors which permit the energization and de-energization of the armature windings in the motor. Conventional rotation sensor devices, as discussed above, have included photo-optic arrangements in which a light beam is interrupted by movement of the rotor so as to provide a position signal. Other rotation sensor devices include a magnetic field movable with the rotor in combination with a Hall effect device for sensing the movement. Also resolvers, synchros and potentiometers ncan be used to provide a rotor position signal.

U.S. Pat. No. 4,329,636 to Uchida et al issued May 11, 1982 teaches one such rotation sensor device with a rotor having a magnetic pole disposed thereon and a magnetic sensor element for sensing increases and decreases of magnetic flux density due to rotation of the rotor. A control circuit separates position signal information from speed signal information and controls the conduction of associated thyristors which in turn control the sequencing of current pulses applied to the armature windings of the motor.

The prior art rotor position sensing devices have inherent problems which the present invention addresses. The Hall effect devices tend to over-heat and require a substantial volume, rendering motors equipped with such sensors larger, bulkier, and more expensive, than is desirable. Optical encoders are subject to diode failure and photo-sensitive transistor failure. In addition, a coating or film of dust or debris can interfere with the light transmission properties. Resolvers, synchros and potentiometers all require significant added volumes with substantail additional complexity, the most important of which is the requirement for separate electrical excitation.

SUMMARY OF THE INVENTION

It is an object of the present invention to provide a self-controlled synchronous motor with a rotation sensor device which is compact, lightweight, and highly reliable.

It is a further object of the present invention to provide a rotor position sensor device for a self-controlled synchronous motor which involves no rotating parts other than the rotor itself.

It is a still further object of the present invention to provide rotor position sensors which require no separate electrical excitation.

It is an additional object of the present invention to provide a means for sensing velocity by outputting a pulse stream to a suitable frequency counter, i.e. a tachometer or speedometer.

It is a still further object of the present invention to provide a self-controlled synchronous motor with a rotor position sensor device requiring little or no additional space or structure within the motor itself.

In its method aspects, the invention achieves the above and other objects by the steps of sensing changes in the field intensity due to rotation of the rotor and generating electrical signals corresponding to said magnetic field intensity changes; and in response to said electrical signals, applying currents to at least one armature winding based upon the position of the rotor.

In its apparatus aspects, the present invention achieves the above and other objects in a self-controlled synchronous motor including a housing, at least one armature winding fixedly mounted on said housing, a rotor rotatably mounted in said housing, said electric motor further comprising field magnet means fixedly mounted on said rotor and including a plurality of magnetic poles of alternating polarity disposed at predetermined angular intervals around said rotor, said field magnet means thereby producing magnetic flux, the polarity of which alternates at said predetermined angular interval in the circumferential direction of said rotor; magnetic field intensity sensor means for detecting changes in the magnetic field intensity produced by movement of said field magnet means during rotation of said rotor and for producing an electric signal corresponding to said changes in magnetic field intensity; and control means, responsive to said electric signal, for applying current to said at least one armature winding based upon the position of said rotor.

BRIEF DESCRIPTION OF THE DRAWINGS

A more complete appreciation of the invention, and many of the attendant advantages thereof, will be readily apparent as the same becomes better understood by reference to the accompanying drawings, wherein.

DETAILED DESCRIPTION OF PREFERRED EMBODIMENTS

Figure 1:
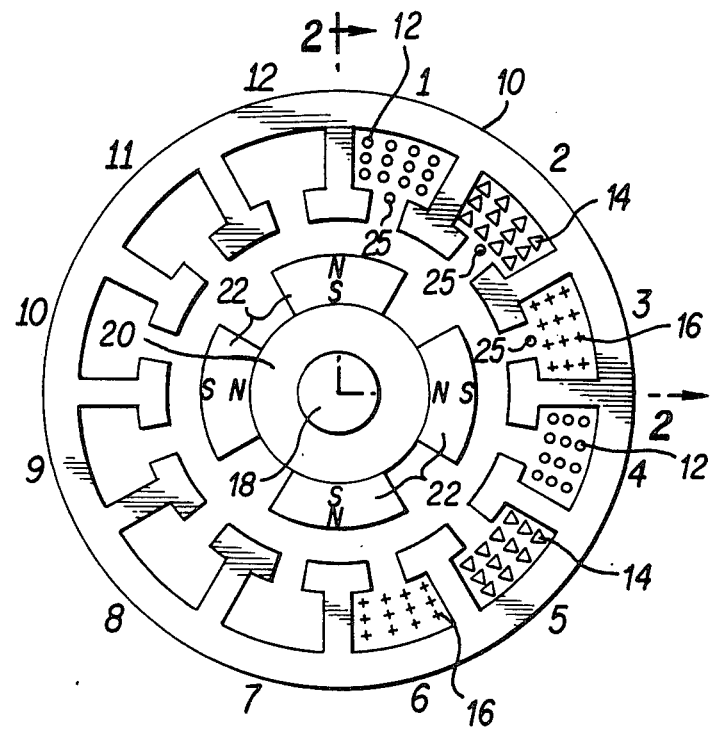
FIG. 1 is an end cross-sectional view of a self-controlled synchronous motor in accordance with the present invention.

Referring to the drawings wherein like reference numerals are applied to similar structures throughout the several views, FIG. 1 illustrates a sectional view of a radial air gap motor which includes an armature pole piece 10 generally comprised of a plurality of steel laminations in the plane of the figure to reduce eddy current losses and for convenience of manufacture. Three separate phases of armature windings are illustrated with phase A indicated by circles 12, phase C indicated by triangles 14, and phase B indicated by crosses 16. The windings are disposed in slots in the armature pole piece labeled from 1 to 12. The windings are illustrated only in slots 1-6 and would also exist in slots 7-12, respectively. It can be seen that the phase A armature windings are disposed in slots 1, 4, 7 and 10, phase C windings are disposed in slots 2, 5, 8 and 11, and phase B windings are disposed in slots 3, 6, 9 and 12.

Disposed within the armature pole piece and windings is a rotor shaft 18 surrounded by yoke 20. A field magnet means, formed for example of permanent magnets 22, is disposed on the yoke with alternating polarities so as to provide variations in flux intensity as shaft 18 rotates. A wound field magnet could also be used but would require slip rings for energization. The rotor, comprising shaft 18, yoke 20 and magnets 22, is driven by the changing magnetic field at the various armature windings, as is well-known in self-controlled synchronous motors.

It has recently been discovered that variations in magnetic field intensity can be sensed by ferritic (Fe 6-12% Ni) alloys which have been plastically twisted. As reported in *Ferritic Fe-Ni Magnetic Sensor Wires With End-to-End Voltage-Generating Characteristics* by S. Jin et al, presented at the Magnetism & Magnetic Materials conference in November 1984 (herein incorporated by reference), relatively large voltage pulses can be obtained from properly processed wires - voltage pulses on the order of 0.1-1 volts at the ends of a 0.025 cm diameter and 2-10 centimeter long wire switched by external AC fields (60 Hz-100 kHz) of 40-200 oersteds. Specifically, an Fe-6% Ni (by weight) alloy wire having a microduplex structure was given a torsional deformation of approximately 720° per 10 centimeters in wire length, and then released so that the elastic portion of the deformation was removed and only the plastic portion remains. Voltage pulses from the ends of a 12 centimeter long Fe-6 Ni wire, prepared as noted above, when switched by a 60 Hz sinusoidal field of 200 oersteds peak provided half amplitude pulse widths in the range of from 10 to 100 microseconds with an output voltage of 180 mV. Alloy wires without the microduplex structure, for example, single phase alloys, exhibit a voltage output after plastic twisting which is typically one-half to one-third of the value obtained from the microduplex structure.

Ferritic sensor wires 25 are illustrated in slots 1, 2 and 3 of FIG. 1, although they could as easily be located in slots 1, 5 and 9 (120 mechanical degrees apart). It has been established that the changes in magnetic field intensity H as measured in oerstends, is sufficiently great to provide a motor position signal output useful in controlling the application of current to the armature windings in a self-controlled synchronous motor. It should be noted that although Uchida et al suggests magnetic sensor elements, these elements operate based upon variations in flux density B, measured in gausses, rather than magnetic field intensity H, measured in oersteds as in the present invention.

It may not be immediately obvious that considerable advantage can be derived from use of the magnetic field intensity sensor for rotor position and speed in self-synchronous motor applications. Such advantages include the ability to locate the sensor at many points in the motor because the sensor response is totally independent of the material at the point of sensor location. In effect, the magnetic field intensity sensor will function in air, in insulation material, within the motor armature winding, in the lamination material or at the interface of any two of these. The triggering ability of the sensor is not dependent upon the material in which it is located, since the magnetic field intensity H is the same at a particular location for all material at that location, unlike the magnetic flux density B, which is directly related to the properties of the materials. This fact is highlighted by the well-known equation, $B = \mu H$, where $\mu$ is the coefficient of permeability.

Figure 2:
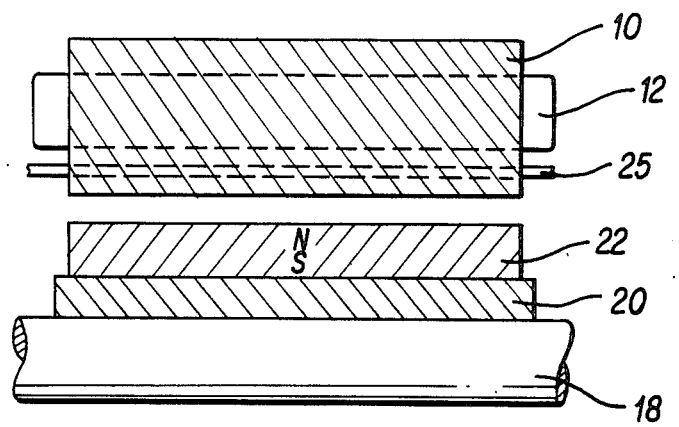
FIG. 2 is a partial cross-sectional view along section lines 2—2 of FIG. 1.
Figure 3:
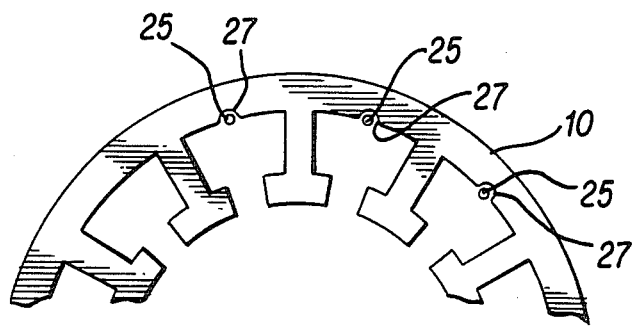
FIG. 3 is an end view of modified armature pole pieces in accordance with a further embodiment of the present invention.

Although FIGS. 1 and 2 illustrate the sensor wires being located relatively close to the magnets 22, they could be located at a significant distance from the magnets as illustrated in FIG. 3. As noted above, as long as the magnetic field intensity at a particular location is a measure of the rotor position, then it doesn't matter what the material is located at that position. In FIG. 3, notches 27 are provided in the steel laminations making up the armature pole piece which provides a protected area for location of the sensor winding without disturbing its sensitivity to variations in magnetic field intensity. Magnetic saturation effects usually associated with lamination materials are of no consequence to the magnetic field intensity sensor in the present embodiment. It will be remembered that while the magnetic flux density is high through the lamination, the magnetic field intensity which is driving the magnetic flux remains unchanged by the presence of the steel laminations. This is an advantage of the magnetic field intensity sensor over many other types of rotor position and velocity sensors which are dependent both on their specific location and on materials present at that location, and may require external electrical excitation.

Figure 4:
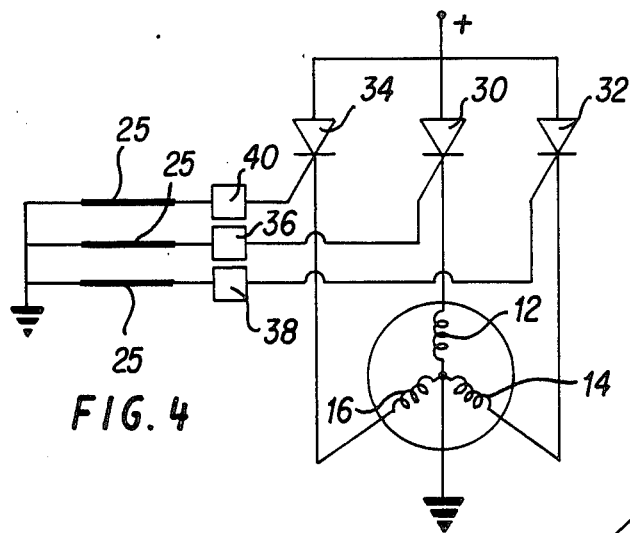
FIG. 4 is a connection diagram illustrating the connection of the motor armature windings with the sensor wires and thyristor control circuit in one embodiment of the present invention.

FIG. 4 illustrates a simplified version of the FIG. 1 self-controlled synchronous motor. Each of the windings 12, 14 and 16 is connected between ground and a positive power supply through thyristors 30, 32 and 34, respectively. Sensor wires 25 are connected to the triggering gate of the thyristors 30, 32 and 34 through delay lines 36, 38 and 40, respectively. With the sensor wires suitably positioned as illustrated in FIG. 1, there may be no need for any delay and therefore a zero delay could be provided and delay lines 36, 38 and 40 dispensed with. Because of the narrow pulse width produced by sensor wire 25 when the maximum change in magnetic field intensity is sensed, the appropriate thyristor is triggered into conduction permitting that armature winding to conduct, generating the appropriate armature field. As the field magnet of the rotor rotates, the appropriate sensor wires energize and de-energize armature windings so as to cause the armature field to rotate as well, thereby providing the driving force for the motor.

Where the sensor wire is not properly positioned such that it will timely trigger conduction in the armature winding (due to convenience in mounting the sensor wire, variation in position due to changing manufacturing tolerances, etc.), delay lines 36, 38 and 40 may be used to correct firing timing. The variable and/or fixed delay lines could be utilized and the delay adjusted as needed. In some circumstances, a single delay line triggering multiple armature windings would be useful, especially where the sensors are equiangularly positioned.

If desirable, sensor wires could be doubled back-and-forth in a given slot to increase the voltage level produced for triggering the thyristor, or any othen control circuit utilized to govern current supplied to the armature windings. Apparently, the voltage generating mechanism is dependent only on the change in magnetic field intensity and the physical echaracteristics of the plastically twisted, microduplex-structured wire and, as long as the direction of twisting is consistent, the voltage generation will be additive for a doubled wire line.

Figure 5:
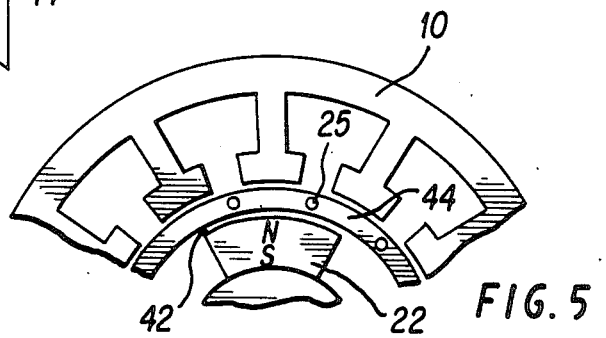
FIG. 5 is an end view of a portion of a self-controlled synchronous motor in accordance with a further embodiment of the present invention.

The advantages of such a ferritic wire position sensor are numerous and significant. Its small size and relatively rugged construction allow self-controlled synchronous motors of a significantly smaller size with the same power capability. The cost of the rotor position sensor device is reduced by substantially two orders of magnitude, which in and of itself renders the resultant motor quite attractive commercially. Such sensor wire equipped motors would not have the drawbacks of previous art sensing devices noted in the background of the invention portion of this specification. Furthermore, the location of the sensing wires in a recessed portion of the armature pole piece provides further protection from destruction by foreign objects or debris entering the motor. Their external location adjacent the pole pieces as in FIG. 3 provides a cooler location than the internal position illustrated in FIG. 1. It may also be advantageous to mount the sensor wires 25 in the air gap 42 between the field magnets 22 and the armature pole pieces 10 as shown in FIG. 5. The sensor wires 25 could be bonded into a fixed or rotatable cylinder 44 where rotation of the cylinder would permit timing adjustment.

Figure 6:
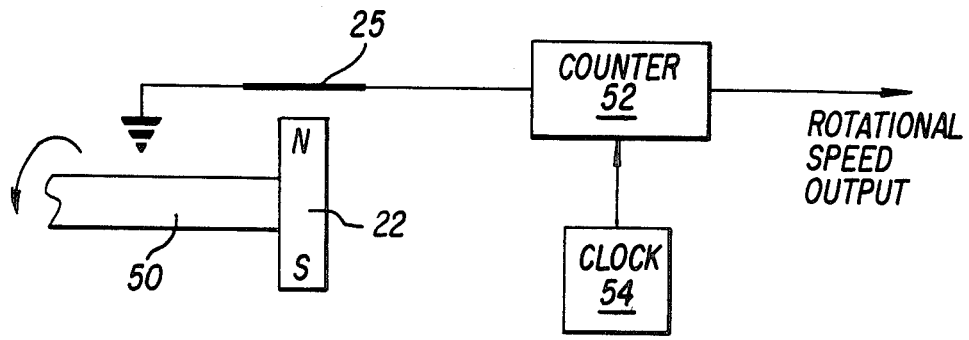
FIG. 6 is a partial block diagram of a further embodiment of the present invention.

The field intensity sensor wire can also be used as a tachometer or speedometer to provide a roational speed indication. In FIG. 6, there is shown a rotating shaft 50 with a field magnet 20 fixedly mounted thereon. Sensor wire 25, responsive to the field intensity variations caused by the magnet, provide output pulses to counter 52. The clock 54 provides a time base in order to determine the pulses per unit time, allowing counter 52 to provide a rotational speed output such as revolutions per minute (RPM), miles per hour (MPH) etc.

Although the present invention has been described relative to a number of specific embodiments thereof, it is not so limited and many modifications and variations thereof will be readily apparent to those skilled in the art in light of the above teachings. Any number of armature windings could be controlled by one or more sensor wires through various known control circuit systems such as thyristors, transistors, etc. The location of the sensor wires could be at any position inside or outside the motor housing where the variations in field intensity can be sensed. The sensor wires could be precisely located such that their outputs directly control the conduction through the appropriate armature windings or their outputs could be amplified to provide the desired armature conduction control signal. Furthermore, the sensor wires could be located at a position other than the optimal rotational location and the sensor signal, passing through a suitable delay line, could still trigger control circuitry to cause conduction in the armature winding at the most desirable point of rotor rotation. Although a radial air gap motor is illustrated in FIGS. 1-5, the present invention could also be applied to axial air gap motors with similar advantages. It is, therefore, to be understood that within the scope of the appended claims, the invention may be practiced otherwise than as specifically described.

The embodiments of the invention in which an exclusive property or privilege is claimed are defined as follows:

1. A self-controlled synchronous motor including a housing, at least one armature winding fixedly mounted on an armature pole piece in said housing, and a rotor rotatably mounted in said housing, said synchronous motor further comprising:

field magnet means fixedly mounted on said rotor and including a plurality of magnetic poles of alternating polarity disposed at predetermined angular intervals around said rotor, said field magnet neans thereby producing mangetic flux, the polarity of which alternates at said predetermined angular interval in the circumferential direction of said rotor;

magnetic field intensity sensor means for detecting changes in the magnetic field intensity produced by movement of said field magnet means during rotation of said rotor and for producing an electric signal corresponding to changes in magnetic field intensity; and control means, responsive to said electric signal, for applying current to said at least one armature winding based upon the position of said rotor.

2. A self-controlled synchronous motor in accordance with claim 1, wherein said sensor means comprises at least one sensor wire comprising a plastically-twisted FeNi alloy wire.

3. A self-controlled synchronous motor in accordance with claim 2, wherein said field magnet means comprises at least one permanent magnet.

4. A self-controlled synchronous motor in accordance with claim 2, wherein said FeNi alloy wire is comprised of an Fe-6% Ni (by wt %) alloy wire having a microduplex structure.

5. A self-controlled synchronous motor in accordance with claim 1, wherein said motor inlcudes a radial air gap between said field magnet means and said armature pole piece.

6. A self-controlled synchronous motor in accordance with claim 5, wherein said sensor means comprises at least one sensor wire comprising a plastically-twisted FeNi alloy wire.

7. A self-controlled synchronous motor in accordance with claim 6, wherein said sensor wire is located at least partially in said air gap.

8. A self-controlled synchronous motor in accordance with claim 7, wherein said sensor wire is mounted in a cylinder located in said air gap.

9. A self-controlled synchronous motor in accordance with claim 6, wherein said armature pole piece includes at least one means defining a groove in said pole piece and said at least one sensor wire is disposed in said groove.

10. A self-controlled synchronous motor in accordance with claim 9, wherein said means defining a groove is located on an inner surface of said pole piece displaced from said air gap.

11. A self-controlled synchronous motor in accordance with claim 1, wherein said control means includes at least one delay line means for adjusting the timing of current applied to said armature windings.

12. A rotational speed indicating apparatus for indicating the rotational speed of a shaft, said apparatus comprising:
  field magnet means fixedly mounted on said shaft, including a plurality of poles of alternating polarity disposed at predetermined angular internals around said shaft, said field magnet means thereby producing magnetic flux, the polarity of which alternates at said predetermined angular interval in the circumferential direction of said shaft;
  magnetic field intensity sensor means for detecting changes in the magnetic field intensity produced by movement of said field magnet means during rotation of said shaft and for producing electrical signal pulses corresponding to changes in magnetic field intensity; and
  means for counting said electric signal pulses per unit of time and for providing an output indicative of such count.

13. A rotational speed indicating apparatus in accordance with claim 12, wherein said sensor means comprises at least one sensor wire comprising a plastically-twisted FeNi alloy wire.

14. A rotational speed indicating apparatus in accordance with claim 13, wherein said field magnet means comprises at least one permanent magnet.

15. A rotational speed indicating apparatus in accordance with claim 14, wherein said FeNi alloy wire is comprised of an Fe-6% Ni (by wt) alloy wire having a microduplex structure.

16. A method of operating a self-controlled synchronous motor including a housing, at least one armature winding fixedly mounted on said housing, a rotor rotatably mounted in said housing and a field magnet means fixedly mounted on said rotor and including a plurality of magnetic poles of alternating polarity disposed at predetermined angular intervals around said rotor, said field magnet means thereby producing magnetic flux, the polarity of which alternates at said predetermined angular interval in the circumferential direction of said rotor, said method comprising the steps of:
  sensing changes in the magnetic field intensity during rotation of the rotor and generating an electric signal corresponding to said changes; and
  in response to said electrical signal, applying current to said at least one armature winding based upon the position of said rotor.

17. A method of sensing rotational speed of a rotating shaft having a field magnet means fixedly mounted on said shaft and including a plurality of magnetic poles of alternating polarity disposed at predetermined angular intervals around said shaft, said field magnet means thereby producing magnetic flux, the polarity of which alternates at said predetermined angular intervals in the circumferential direction of said shaft, said method comprising the steps of:
  sensing changes in the magnetic field intensity durlng rotation of the shaft and generating electrical signal pulses corresponding to said changes; and
  counting said pulses per unit of time and providing an output indicative of said count.

* * * * *